(12) United States Patent
Ohashi et al.

(10) Patent No.: US 8,943,217 B2
(45) Date of Patent: Jan. 27, 2015

(54) SYSTEMS AND METHODS FOR OPERATING AN APPLIANCE CONTROL DEVICE FOR AN APPLIANCE

(75) Inventors: Yoshinori Ohashi, Tokyo (JP); Tsuyoshi Honma, Tokyo (JP); Eiju Yamada, Kanagawa (JP); Shin Ito, Tokyo (JP)

(73) Assignee: Sony Corporation (JP)

( * ) Notice: Subject to any disclaimer, the term of this patent is extended or adjusted under 35 U.S.C. 154(b) by 177 days.

(21) Appl. No.: 13/305,071

(22) Filed: Nov. 28, 2011

(65) Prior Publication Data

US 2012/0144058 A1 Jun. 7, 2012

(30) Foreign Application Priority Data

Dec. 6, 2010 (JP) ................................ P2010-271869

(51) Int. Cl.
G06F 15/16 (2006.01)
H04L 12/28 (2006.01)

(52) U.S. Cl.
CPC .......... *H04L 12/281* (2013.01); *H04L 12/2816* (2013.01); *H04L 12/282* (2013.01)
USPC ........................................................ 709/232

(58) Field of Classification Search
None
See application file for complete search history.

(56) References Cited

U.S. PATENT DOCUMENTS

| 6,556,219 B1 * | 4/2003 | Wugofski .................. 715/762 |
| 2005/0128957 A1 * | 6/2005 | Yuki ............................ 370/254 |
| 2006/0133392 A1 * | 6/2006 | Ajitomi et al. ............... 370/401 |
| 2008/0077700 A1 * | 3/2008 | Hibino ......................... 709/230 |
| 2008/0301267 A1 * | 12/2008 | Chang et al. ................ 709/220 |
| 2009/0070840 A1 | 3/2009 | Kamimaki et al. |

FOREIGN PATENT DOCUMENTS

| JP | 2004348455 A | 12/2004 |
| JP | 2006-165982 A | 6/2006 |
| JP | 2009-130876 A | 6/2009 |
| WO | 03038630 A1 | 5/2003 |

OTHER PUBLICATIONS

European Search Report Application No. EP 11191071, dated Feb. 28, 2012.
Office Action from Japanese Application No. 2010-271869, dated Jun. 3, 2014.

* cited by examiner

*Primary Examiner* — Mohamed Wasel
*Assistant Examiner* — Tsung Wu
(74) *Attorney, Agent, or Firm* — Lerner, David, Littenberg, Krumholz & Mentlik, LLP

(57) ABSTRACT

Systems and methods for operating an appliance control device for controlling the operation of a variety of appliances are provided. The appliance control device may acquire a list identifying one or more functions executable by an appliance. The list may further identify a corresponding protocol corresponding to each function included in the list. The appliance control device may transmit a request to the appliance for execution of a desired function selected from the list using a specified protocol selected based on the corresponding protocol corresponding to the desired function. In turn, the appliance may transmit the list to the appliance control device upon request. Further, the appliance may also receive the request to execute the desired function in accordance with the selected specified protocol, and execute the desired function in response to the request.

15 Claims, 17 Drawing Sheets

FIG.7

```
<actionList>
<action name="register" ver="1.2" mode="1" url="http://192.168.1.1:80/register" />
<action name="getSystemInformation" ver="1.3" url="http://192.168.2.1:80/getSystemInformation" />
<action name="getRemoteCommandList" ver="1.2" url="http://192.168.1.1:80/getRemoteCommandList" />
<action name="getStatus" ver="1.2" url="http://192.168.1.1:80/getStatus" />
<action name="getText" ver="1.2" url="http://192.168.1.1:80/getText" />
<action name="sendText" ver="1.2" url="http://192.168.1.1:80/sendText" />
<action name="getContentInformation" ver="1.2" url="http://192.168.1.1:80/getContentInformation" />
<action name="getHistoryList" ver="1.2" url="http://192.168.1.1:80/getHistoryList" />
<action name="getWebServiceList" ver="1.2" url="http://192.168.1.1:80/getWebServiceList" />
<action name="sendContent" ver="1.2" url="http://192.168.1.1:80/sendContent" />
</actionList>
```

Req1

GET /Register_actionURL?name=Client1&registrationType=initial&
deviceId=ClientName%3a00-00-00-00-00-01 HTTP/1.1

FIG.8B

Res1

HTTP/1.1 200 OK
:

FIG.9A

```
                                                              Req2
GET /getSystemInformation_actionURL HTTP/1.1
```

FIG.9B

```
                                                              Res2
HTTP/1.1 200 OK
 :
<systemInformation>
 <name>BDPlayer</name>
 <generation>2011</generation>
 <area>USA</area>
 <remoteTypebundled="true">RMT-XXX1</remoteType>
 <remoteType>RMT-XXX2</remoteType>
 <remoteType>RMT-XXX3</remoteType>
 <actionHeadername="CERS-DEVICE-ID" />
 <supportContentsClass>
  <class>video</class>
  <class>music</class>
 </supportContentsClass>
 <supportSource>
  <source>CD</source>
  <source>DVD</source>
  <source>BD</source>
 </supportSource>
</systemInformation>
```

FIG.10A

```
GET /getRemoteCommandList_actionURL HTTP/1.1
```
~Req3

FIG.10B

~Res3
```
HTTP/1.1 200 OK
 :
<remoteCommandList>
 <command name="Up" type="ircc" value="AAAAAgAAHFoAAAA5AA==" />
 <command name="Down" type="ircc" value="AAAAAgAAHFoAAAA6AA==" />
 <command name="Right" type="ircc" value="AAAAAgAAHFoAAAA8AA==" />
 <command name="Left" type="ircc" value="AAAAAgAAHFoAAAA7AA==" />
 <command name="Enter" type="ircc" value="AAAAAgAAHFoAAAA9AA==" />
 <command name="Home" type="url" value="http://192.168.1.1/Home" />
      :
</remoteCommandList>
```

FIG.11A

```
                                                            Req4
GET /getStatus_actionURL HTTP/1.1
```

FIG.11B

```
                                                            Res4
HTTP/1.1 200 OK
:
<statusList>
 <status name="viewing">
  <statusItemfield="source" value="BD" />
  <statusItemfield="currentSec" value="60" />
  <statusItemfield="duration" value="3600" />
  <statusItemfield="speed" value="1" />
 </status>
</statusList>
```

FIG.12A

```
GET /getWebServiceList_actionURL?lang=jp HTTP/1.1
```
~Req5

FIG.12B

~Res5
```
HTTP/1.1 200 OK
 :
<webServiceList>
  <defaultFocus>service:service1</defaultFocus>
  <webService>
   <id>service:service1</id>
   <title>Title of service1</title>
   <description>Description of Service1</description>
   <serviceUrl>http://address:port/service1</serviceUrl>
   <serviceImageUrl>
    <image type="icon">http://address:port/service1/image/x.png</image>
   </serviceImageUrl>
   <settingStypeUrl>http://address:port/service1/style.css</settingStypeUrl>
  </webService>
  <webService>
   <id>service:service2</id>
     :
</webServiceList>
```

FIG.13A

Req6

```
GET /getContentInformation_actionURL HTTP/1.1
```

FIG.13B

Res6

```
HTTP/1.1 200 OK
:
<contentInformation>
 <infoItemfield="class" value="video"/>
 <infoItemfield="source" value="BD"/>
 <infoItemfield="title" value="title"/>
 <infoItemfield="edition" value="edition"/>
 <infoItemfield="description" value="description"/>
 <infoItemfield="genre" value="genre"/>
 <infoItemfield="iconData" value="iconData"/>
 <infoItemfield="duration" value="duration"/>
 <infoItemfield="actor" value="actor"/>
 <infoItemfield="director" value="director"/>
 <infoItemfield="producer" value="producer"/>
 <infoItemfield="screenWriter" value="screenWriter"/>
 <infoItemfield="rating" value="rating"/>
 <infoItemfield="dateRelease" value="dateRelease"/>
</contentInformation>
```

FIG.14A

Req7

GET /getHistoryList_actionURL?class=video HTTP/1.1

FIG.14B

Res7

```
HTTP/1.1 200 OK
:
<historyList>
 <contentInformation>
  <infoItemfield="title" value="title name 1"/>
  <infoItemfield="infoUrl" value="http://192.168.1.1/infoUrl/1"/>
 </contentInformation>
 <contentInformation>
  <infoItemfield="title" value="title name 2"/>
  <infoItemfield="infoUrl" value="http://192.168.1.1/infoUrl/2"/>
 </contentInformation>
 <contentInformation>
  <infoItemfield="title" value="title name 3"/>
  <infoItemfield="infoUrl" value="http://192.168.1.1/infoUrl/3"/>
 </contentInformation>
 :
</historyList>
```

FIG.15A

~Req8

GET /getText_actionURL HTTP/1.1

FIG.15B

~Res8

HTTP/1.1 200 OK
:
<text>
　Text data
</text>

FIG.16A

~Req9

GET /sendText_actionURL?text=textData HTTP/1.1

FIG.16B

~Res9

HTTP/1.1 200 OK
:

FIG.17A

Req10

GET /getContent_actionURL HTTP/1.1

FIG.17B

Res10

HTTP/1.1 200 OK
Content-Type: application/x-www-form-urlencoded
Content-Length: 32
:
url=http%3A%2F%2Fwww.example.com

FIG.18A

~Req11

```
POST /sendContent_actionURL HTTP/1.1
HOST: 192.168.1.1
Content-Type: application/x-www-form-urlencoded
Content-Length: 32
  :
url=http%3A%2F%2Fwww.example.com
```

FIG.18B

~Res11

```
HTTP/1.1 200 OK
  :
```

SYSTEMS AND METHODS FOR OPERATING AN APPLIANCE CONTROL DEVICE FOR AN APPLIANCE

CROSS REFERENCE TO RELATED APPLICATIONS

The present disclosure contains subject matter related to that disclosed in Japanese Priority Patent Application JP 2010-271869 filed in the Japan Patent Office on Dec. 6, 2010, the entire content of which is hereby incorporated herein by reference.

BACKGROUND

The present disclosure relates to an appliance control device for an appliance, an appliance control method, and a program.

In related art, an appliance control system for controlling a plurality of different appliances by using a control device such as a universal controller is known. According to the appliance control system, an appliance providing a service acts as a server, and a control device (appliance control device) receiving the service acts as a client. The control device controls the appliance by requesting a service, via the appliance, for execution of a function. The execution of a function is requested according to a protocol specification that is determined for each service with respect to each appliance.

An execution request for a basic function is here defined as a standard protocol specification that is shared among a plurality of different appliances or a plurality of difference services. However, with respect to each appliance, an execution request for an extended/modified function is defined for each service as an individual protocol specification, together with the execution request for a basic function, to cope with restrictions on the implementation or individual demand. Accordingly, the control device is made to manage a protocol specification that is different for each service with respect to each appliance in association with the service of each appliance.

SUMMARY

Accordingly, the control device is made to manage a protocol specification that is different for each service with respect to each appliance, and unification of implementations may become difficult. Also, compatibility with an appliance whose protocol specification is not managed may become difficult to achieve.

In light of the foregoing, an appliance control device is provided. The appliance control device may include a control unit configured to acquire a list identifying one or more functions executable by a first appliance. The list may also include information indicative of a corresponding protocol corresponding to each function executable by the first appliance. The control unit may transmit a request to the first appliance for execution of a desired function selected from the list identifying the one or more functions executable by the first appliance. The transmitted request may be transmitted in accordance with a specified protocol selected from a specified plurality of protocols, where the specified protocol may be selected from the specified plurality of protocols based on the information in the list indicative of the corresponding protocol corresponding to the desired function.

In one aspect, the control unit may be further configured to select the specified protocol based on a determination that the specified protocol is compatible with the corresponding protocol indicated in the list as corresponding to the desired function.

In another aspect, the first appliance may be one of a plurality of appliances, and the control unit may be further configured to: receive an instruction to connect to one or more appliances in the plurality of appliances, where the one or more appliances include the first appliance. The control unit may transmit, based on the instruction to connect to the one or more appliances, a detection request to each of the one or more appliances and receive a detection response from each of the one or more appliances in response to the detection request transmitted to each of the one or more appliances. The control unit may establish, based on the detection response received from each of the one or more appliances, a connection with each of the one or more appliances and transmit, upon establishment of the connection with each of the one or more appliances, a request for information to each of the one or more appliances. The control unit may then receive, in response to the transmitted request for information to each of the one or more appliances, respective appliance information from each of the one or more appliances; and, transmit, based on the respective appliance information received each of the one or more appliances, a respective request to each of the one or more appliances to acquire a list identifying one or more functions executable by each respective appliance in the one or more appliances. In a related aspect, the detection request transmitted to the first appliance may be a Universal Plug And Play ("UPnP") command.

In one aspect, at least one corresponding protocol may be respectively indicated in the list as being a HyperText Transfer Protocol ("HTTP"), and at least one of the specified plurality of protocols may specify the HTTP protocol. In another aspect, at least at least two corresponding protocols respectively indicated in the list may be different versions of a same protocol, where each of the different versions of the same protocol may also be specified in the specified plurality of protocols.

In yet another aspect, the acquired list identifying the one or more functions executable by the first appliance and having the information indicative of the corresponding protocol corresponding to each function may further include information indicative of a corresponding destination corresponding to each function. And, the control unit may be further configured to transmit the request to execute the desired function to the first appliance at a selected destination using the specified protocol. The selected destination may be selected based on the information in the list indicative of the corresponding destination corresponding to the desired function. In a related aspect, the corresponding destination corresponding to the desired function may be a network address. Furthermore, in another aspect the network address may be a Uniform Resource Locator ("URL").

In various aspects, the appliance control device may be implemented in a remote control, a portable information terminal, a phone, or a personal computer. Furthermore, the first appliance may be implemented in a television, a projector, a printer, a recorder, a camera, an audio system, a personal computer, a home appliance, or a gaming machine. In one aspect, the appliance control device may be configured to communicate with the first appliance over a network. In yet another aspect, the network may be a wireless network.

A non-transitory computer-readable storage unit on which computer readable instructions of a program are stored is provided. The instructions, when executed by a control unit, may configure the control unit to acquire a list identifying one or more functions executable by an appliance, where the list further includes information indicative of a corresponding protocol corresponding to each function executable by the appliance. The instructions may further configure the control unit to transmit a request to the appliance for execution of a desired function selected from the list identifying the one or more functions executable by the appliance. The transmitted request may be transmitted in accordance with a specified protocol selected from a specified plurality of protocols, where the specified protocol may be selected from the specified plurality of protocols based on the information in the list indicative of the corresponding protocol corresponding to the desired function.

A method for operating an appliance control device is provided. The method may include acquiring a list identifying one or more functions executable by an appliance, where the list further includes information indicative of a corresponding protocol corresponding to each function executable by the appliance. The method may further include transmitting, using a processor, a request to the appliance for execution of a desired function selected from the list identifying the one or more functions executable by the appliance. The transmitted request may be transmitted in accordance with a specified protocol selected from a specified plurality of protocols, where the specified protocol may be selected from the specified plurality of protocols based on the information in the list indicative of the corresponding protocol corresponding to the desired function. In another aspect of the method, the specified protocol selected from the specified plurality of protocols may be a HyperText Transfer Protocol ("HTTP"), and the transmitted request to the appliance for execution of the desired function may be transmitted via a network using the HTTP protocol.

In various other aspects, an appliance is provided. The appliance may include a control unit configured to receive a request for information regarding a service provided by the appliance. The control unit may be further configured to transmit, in response to the request, a list of information identifying one or more functions executable by the appliance. The transmitted list may further include information indicative of a corresponding protocol corresponding to each function executable by the appliance. In one aspect, the control unit may be further configured to receive a request for execution of a desired function selected from the transmitted list identifying the one or more functions executable by the appliance. The request for the execution of the desired function may be received in accordance with a specified protocol indicated within the transmitted list as corresponding to the desired function. The control unit may further execute the desired function in response to the request for execution of the desired function.

In an additional aspect, the control unit is may be further configured to include information indicative of a corresponding destination corresponding to each function identified in the transmitted list. In some aspects, the appliance may be configured as a television, a projector, a printer, a recorder, a camera, an audio system, a personal computer, a home appliance, or a gaming machine.

A non-transitory computer-readable storage unit on which computer readable instructions of a program are stored is provided. The instructions, when executed by a control unit, may configure the control unit to receive a request for information regarding a service provided by an appliance and transmit a list of information identifying one or more functions executable by the appliance. The transmitted list may further include information indicative of a corresponding protocol corresponding to each function executable by the appliance.

A method for operating an appliance is provided. The method may include receiving a request for information regarding a service provided by the appliance. The method may further include transmitting, in response to the request using a processor, a list of information identifying one or more functions executable by the appliance, where the transmitted list further includes information indicative of a corresponding protocol corresponding to each function executable by the appliance. In a related aspect, the method may further include receiving a request for execution of a desired function selected from the transmitted list identifying the one or more functions executable by the appliance, where the request may be received in accordance with a specified protocol indicated within the transmitted list as corresponding to the desired function. And, the method may further include executing, using the processor, the desired function in response to the request for execution of the desired function by appliance.

A system including an appliance and an appliance control device is provided. The appliance control device may be configured to acquire a list identifying one or more functions executable by the appliance, where the list may include information indicative of a corresponding protocol corresponding to each function executable by the appliance. The appliance control device may be further configured to transmit a request to the appliance for execution of a desired function selected from the list identifying the one or more functions executable by the appliance. The transmitted request may be transmitted in accordance with a specified protocol selected from a specified plurality of protocols, where the specified protocol may be based on the information in the list indicative of the corresponding protocol corresponding to the desired function. The appliance may be configured to receive a request for information regarding a service provided by the appliance and, transmit the list identifying the one or more functions executable by the appliance to the appliance control device in response to the request. The transmitted list may further include information indicative of the corresponding protocol corresponding to each function executable by the appliance. The appliance may be further configured to receive, from the appliance control device, the request for execution of the desired function selected from the transmitted list identifying the one or more functions executable by the appliance. Where, the request for the execution of the desired function may be received in accordance with the specified protocol indicated within the transmitted list as the corresponding protocol to the desired function. In addition, the appliance may also be configured to execute the desired function in response to the request for execution of the desired function by the appliance.

According to the embodiments of the present disclosure described above, there can be provided an appliance and an appliance control device, an appliance control method, and a program, which are capable of improving compatibility among a plurality of different appliances.

BRIEF DESCRIPTION OF THE DRAWINGS

FIG. 7 is a diagram showing an example of the action list;

FIGS. 8A and 8B are diagrams showing an execution example of an action "register";

FIGS. 9A and 9B are diagrams showing an execution example of an action "getSystemInformation";

FIGS. 10A and 10B are diagrams showing an execution example of an action "getRemoteCommandList";

FIGS. 11A and 11B are diagrams showing an execution example of an action "getStatus";

FIGS. 12A and 12B are diagrams showing an execution example of an action "getWebServiceList";

FIGS. 13A and 13B are diagrams showing an execution example of an action "getContentInformation";

FIGS. 14A and 14B are diagrams showing an execution example of an action "getHistoryList";

FIGS. 15A and 15B are diagrams showing an execution example of an action "getText";

FIGS. 16A and 16B are diagrams showing an execution example of an action "sendText";

FIGS. 17A and 17B are diagrams showing an execution example of an action "getContent"; and FIGS. 18A and 18B are diagrams showing an execution example of an action "sendContent".

DETAILED DESCRIPTION OF THE EMBODIMENT(S)

Figure 1:
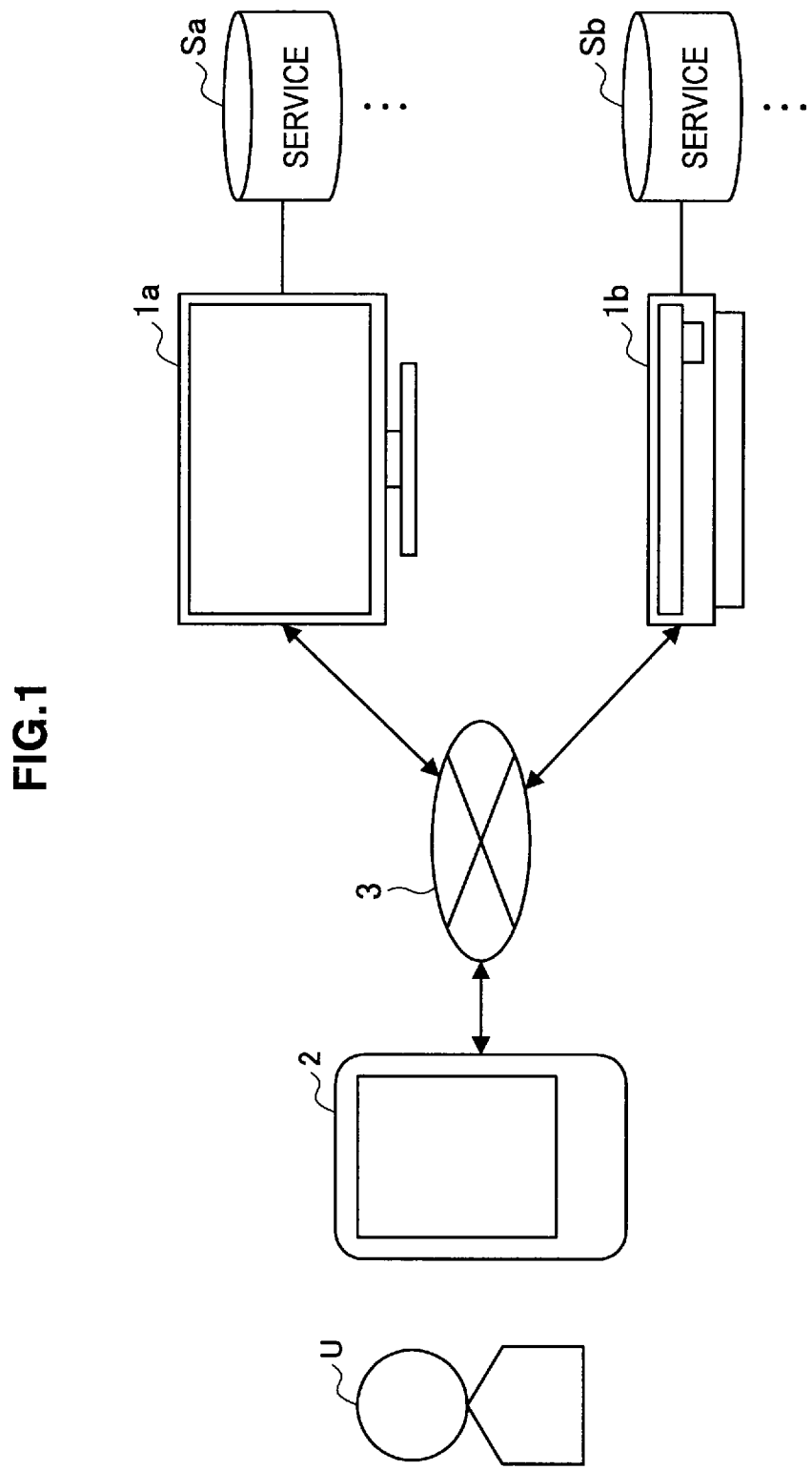
FIG. 1 is a diagram showing a configuration of a general appliance control system.

Hereinafter, preferred embodiments of the present disclosure will be described in detail with reference to the appended drawings. Note that, in this specification and the appended drawings, structural elements that have substantially the same function and configuration are denoted with the same reference numerals, and repeated explanation of these structural elements is omitted.

[1. Configuration of General Appliance Control System]

FIG. 1 is a diagram showing a configuration of a general appliance control system. As shown in FIG. 1, the appliance control system includes appliances 1 (a collective term for appliances) that are control targets, such as appliances 1a and 1b, and a control device (an appliance control device) 2 that controls the appliances 1 via a communication network 3. The appliance 1 provides one or more services S (a collective term for services), such as a Web browsing service, a content output service, a search service, a reproduction service, a recording service, and the like, for example. The control device 2 controls the appliance 1 by requesting, via the appliance 1, the service S for execution of a function.

The appliance 1 is an appliance 1 that can be controlled by the control device 2 via the communication network 3, such as a display, a projector, a printer, a recorder, a camera, an audio system, a personal computer, a home appliance, or the like, for example. The control device 2 is a terminal capable of controlling the appliance 1 via the communication network 3, such as a remote control, a portable information terminal, a mobile phone, a display, a personal computer, or the like. The communication network 3 is a two-way communication network 3 such as a wired or wireless network, such as a digital living network alliance (DLNA), or the like, for example.

In the example shown in FIG. 1, the appliance 1a is a network TV that provides services S such as a Web browsing service, a content output service, and a search service. Also, the appliance 1b is an HDD recorder that provides services S such as a content reproduction service and a recording service. Additionally, in FIG. 1, a service Sa is shown as an example of the services provided by the appliance 1a. Also, in FIG. 1, a service Sb is shown as an example of the services provided by the appliance 1b.

[2. Operation of General Appliance Control System]

Figure 2:
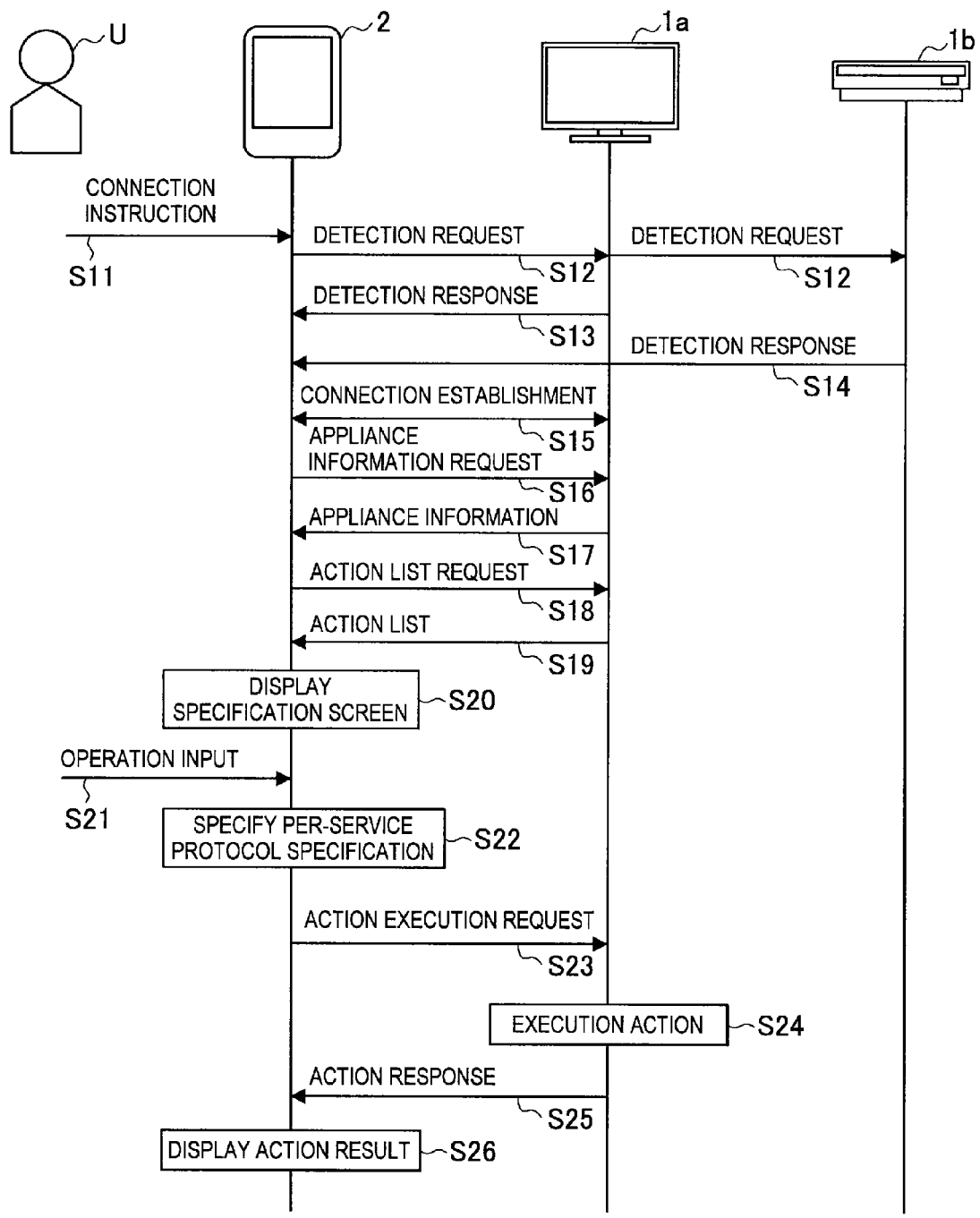
FIG. 2 is a sequence diagram showing an operation of the general appliance control system.

FIG. 2 is a sequence diagram showing an operation of the general appliance control system. In FIG. 2, a user U of the control device 2, the control device 2, and the appliances 1a and 1b respectively providing the services Sa and Sb, for example, are shown.

As shown in FIG. 2, at the time of start of appliance control, the user U specifies a specific appliance 1 and instructs the control device 2 to perform appliance connection (step S11). In the example shown in FIG. 2, the appliance 1a is specified as the specific appliance 1. When the connection instruction is received, the control device 2 detects the appliances 1a and 1b with which connection over the network 3 is possible, and establishes connection with the specific appliance 1a (steps S12 to S15). When the connection with the appliance 1a is established, the control device 2 acquires appliance information from the appliance 1a (steps S16, S17).

When the appliance information is acquired, the control device 2 acquires an action list ALa (a list of functions) from the appliance 1a (steps S18, S19). The action list AL (a collective term for action lists) is a list showing actions A (functions) that become executable due to the service S provided by the appliance 1, and is managed by the appliance 1.

Figure 3:
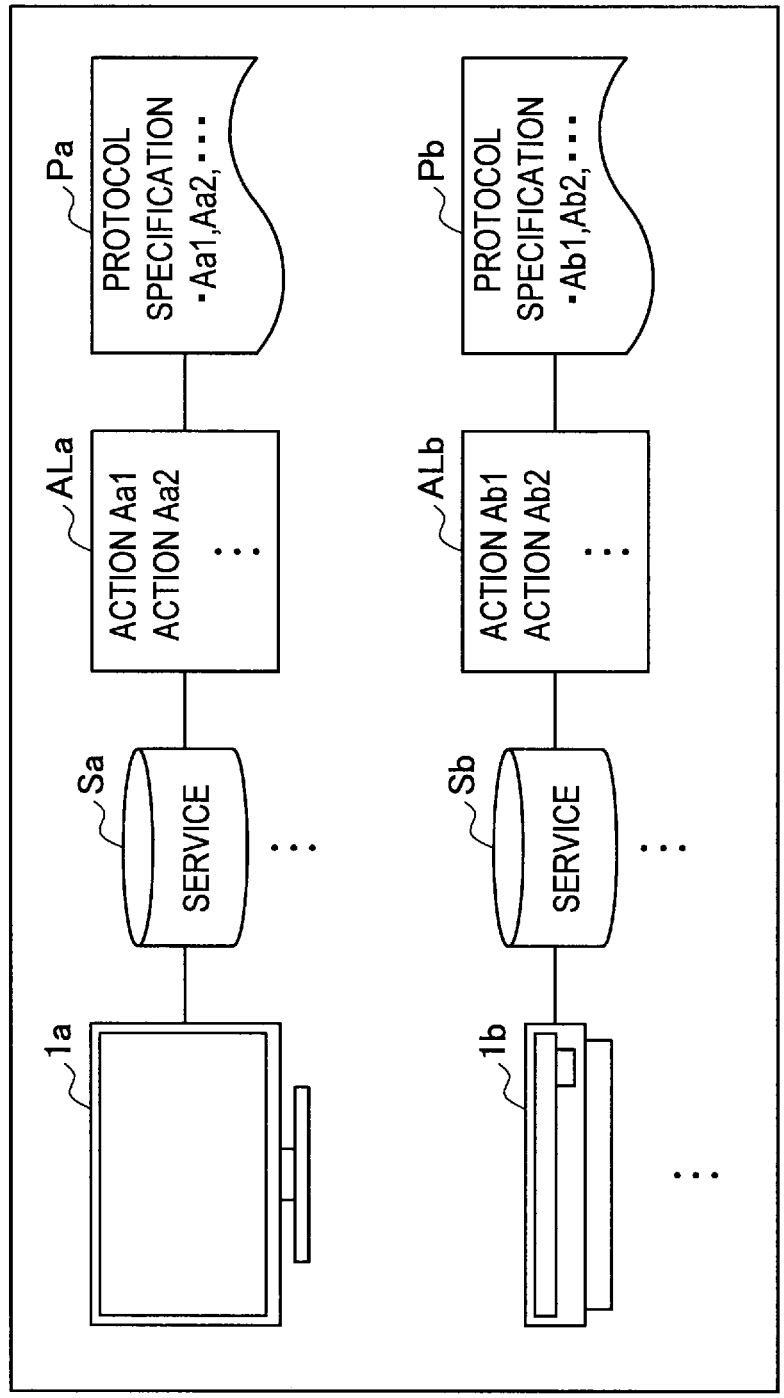
FIG. 3 is a diagram showing an example of a general action list.

FIG. 3 is a diagram showing an example of a general action list AL. As shown in FIG. 3, a protocol specification Pa is defined for the service Sa of the appliance 1a to enable execution of actions Aa1, Aa2, and the like. Also, a protocol specification Pb is defined for the service Sb of the appliance 1b to enable execution of actions Ab1, Ab2, and the like. Furthermore, the actions Aa1, Aa2, and the like, that become executable due to the service Sa are specified for the action list ALa, and the actions Ab1, Ab2, and the like, that become executable due to the service Sb are specified for the action list ALb. Additionally, a different protocol specification P may also be defined for a similar service S depending on the appliance 1 providing the service S.

When the action list ALa is acquired, the control device 2 generates and displays an operation screen (step S20). The control device 2 generates the operation screen based on the content of the actions A (a collective term for actions) included in the action list ALa. The user U inputs a desired operation via the operation screen (step S21)

When the operation input is received, the control device 2 requests the service Sa, via the appliance 1a, for execution of an action A corresponding to the operation input (steps S22, S23). At this time, the execution of the action A is requested by specifying, based on management information managed by the control device 2, a protocol specification P that is determined for each appliance with respect to each service (step S22) and making a request according to the specified protocol specification (step S23).

When the execution of the action A is requested, the service Sa of the appliance 1a executes the requested action A. Then, the control device 2 receives a response corresponding to the action A from the appliance 1a, and generates an execution result of the action A and displays the same. The control device 2 thereby controls the appliance 1a by requesting the service Sa, via the appliance 1a, for the execution of the action A.

An execution request for a basic action A is here defined as a standard protocol specification P such as the UPnP (Universal Plug and Play) specification or the like. However, with respect to each appliance 1, an extended/modified execution request for an extended/modified action A is defined for each service as an individual protocol specification P, together with the execution request for a basic action A, to cope with restrictions on the implementation or individual demand. That is, a standard protocol specification P of a different version or an individual protocol specification P may be used for each service S of each appliance 1. Accordingly, the control device is made to manage a protocol specification P that is different for each service S with respect to each appliance in association with the URL, or the like, of the service S of each appliance 1.

Therefore, the control device 2 is made to manage a protocol specification P that is different for each service S with respect to each appliance 1, and unification of implementations may become difficult. Also, it may be difficult to achieve compatibility with the appliance 1 whose protocol specification P is not managed.

[3. Configuration of Appliance Control System According to Embodiment]

Figure 4:
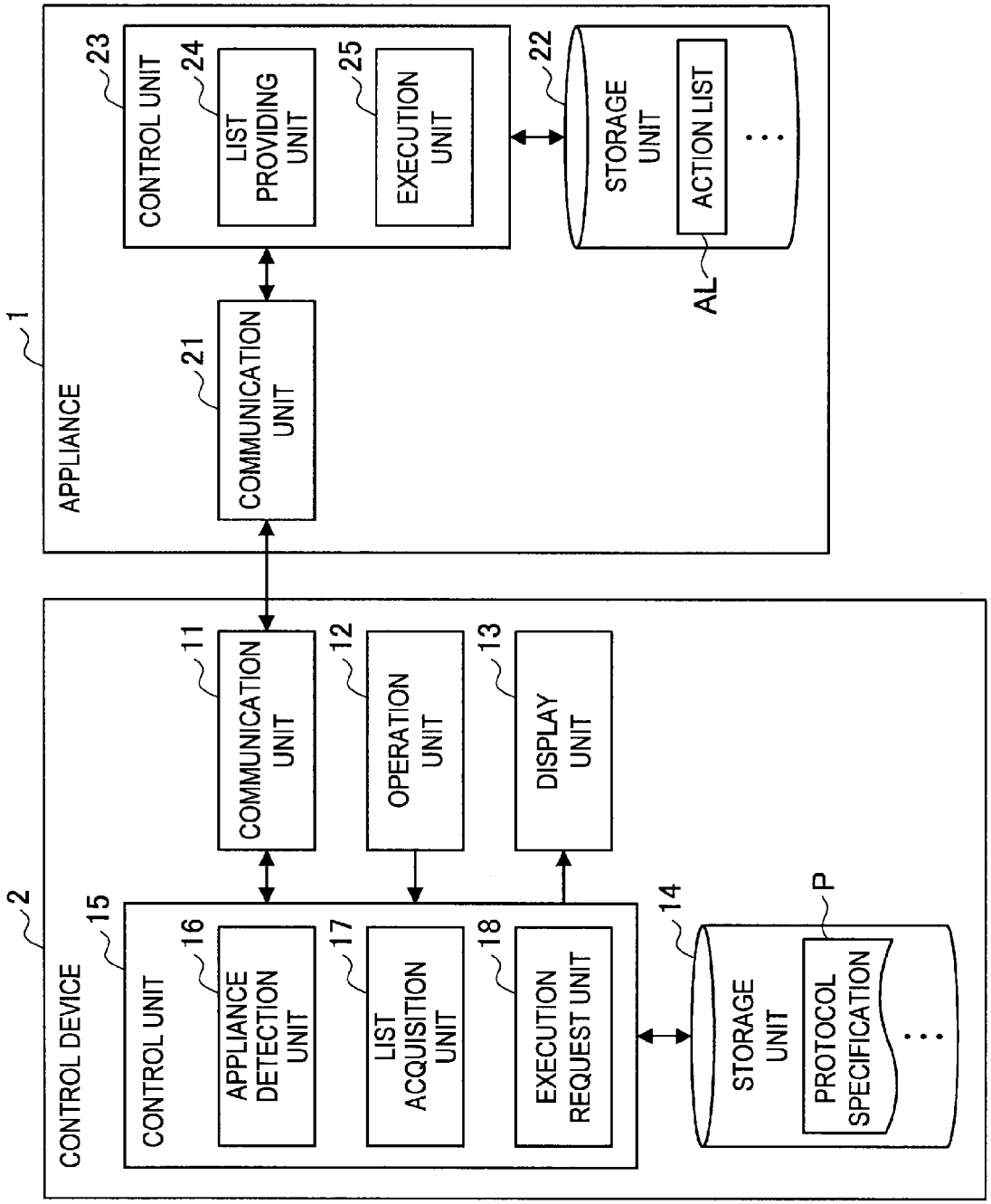
FIG. 4 is a block diagram showing a functional configuration of an appliance control system according to an embodiment of the present disclosure.

FIG. 4 is a block diagram showing a functional configuration of an appliance control system according to an embodiment of the present disclosure. As shown in FIG. 4, the control device (appliance control device) 2 includes a communication unit 11, an operation unit 12, a display unit 13, a non-transitory computer-readable storage unit 14, and a control unit 15. The control unit 15 functions also as an appliance detection unit 16, a list acquisition unit 17, and an execution request unit 18.

The communication unit 11 communicates with the appliance 1 via the network 3. The communication unit 11 distributes a detection request on the network 3 for appliance detection, and receives a detection response from the appliance 1. The communication unit 11 receives appliance information and an action list AL from the appliance 1, and transmits an execution request for an action A to the appliance 1. The communication unit 11 is configured as a communication device for performing two-way communication with the appliance 1 via the network 3.

The operation unit 12 receives, from the user U, a connection instruction, an instruction input, and the like. The operation unit 12 is configured as an input device such as keys, buttons, a touch sensor, or the like.

The display unit 13 displays an operation screen for receiving an operation input, an execution result of the action A corresponding to the operation input, and the like. The display unit 13 may be structured from a liquid crystal display (LCD), an organic electroluminescent display, a plasma display, or the like, or it may be configured as touch panel allowing an operation input by the user U.

The storage unit 14 stores the protocol specification P used for requesting the service S for execution of the action A. The storage unit 14 also stores information for generating the operation screen and the like. The protocol specifications P include various versions of standard protocol specifications P, an individual specification P, and the like, that are defined for respective actions A to enable execution of one or more actions A. A new protocol specification P may be added or an old protocol specification P may be deleted to/from the storage unit 14. Additionally, in FIG. 4, one of the protocol specifications P is shown as "protocol specification P."

The action A is extended/modified with respect to each appliance 1 as necessary. Furthermore, the extended/modified action A is managed by version information allowing unique identification between a plurality of different appliances 1 and the control device 2. Accordingly, the protocol specification P is managed in association with the version information of the action A defined by the protocol specification P. The version information of the action A is information used for specifying the protocol specification P determined for each action.

The control unit 15 performs arithmetic processing or control processing to realize operation of the control device 2. The control unit 15 is configured from a CPU (e.g., a general purpose or micro processor), a ROM, a RAM, and the like, and the operation of the control device 2 described later is realized by the CPU developing and executing a program including one or more instructions stored in a non-transitory computer readable medium such as the storage unit 14, ROM, or the like.

The control unit 15 also functions, in cooperation with the communication unit 11, as the appliance detection unit 16 for detecting an appliance 1 that is to be a control target. The control unit 15 also functions as the list acquisition unit 17 for acquiring, from the appliance 1, a list of actions A (functions) that become executable due to the service S provided by the appliance 1 as the action list AL. The action list AL includes information for specifying the protocol specification P that is determined for each action A with respect to each service S of each appliance 1. The control unit 15 also functions as the execution request unit 18 for requesting the service S, via the appliance 1, for execution of the action A, according to the specified protocol specification P.

The appliance 1 includes a communication unit 21, a non-transitory computer-readable storage unit 22, and a control unit 23. The control unit 23 functions also as a list providing unit 24, and an execution unit 25.

The communication unit 21 communicates with the control device 2 via the network 3. The communication unit 21 transmits a detection response to the control device 2 in response to a detection request. The communication unit 21 transmits the appliance information or the action list AL to the control device 2, and receives an execution request for the action A from the control device 2. The storage unit 22 stores a list of actions A that will become executable due to the service S provided by the appliance 1 as the action list AL. Additionally, in FIG. 4, one of the action lists AL is shown as "action list AL." The control unit 23 also functions, in cooperation with the communication unit 21, as the list providing unit 24 for providing the action list AL of the service S to the control device 2. The control unit 23 also functions as the execution unit 25 for executing the action A requested by the control device 2. The functionality of the control unit 23 may be implemented in hardware, software, or a combination of both. In one aspect, for example, the non-transitory computer-readable storage unit 22 may include one or more programs including instructions executable by the CPU of the control unit, which, when executed by the CPU, may configure the control unit to provide the functionality disclosed herein.

[4. Operation of Appliance Control System According to Embodiment]

Figure 5:
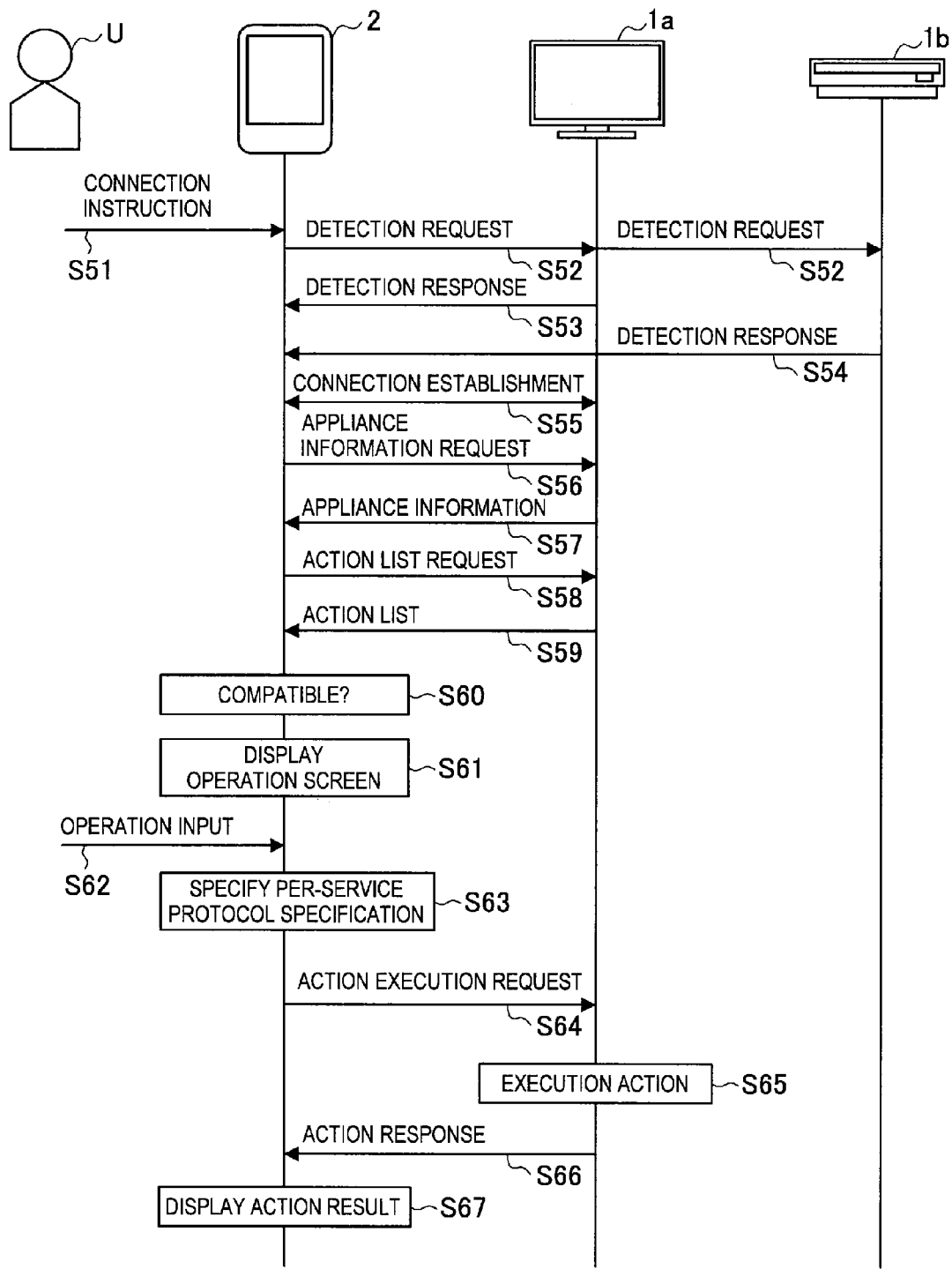
FIG. 5 is a sequence diagram showing an operation of the appliance control system according to the embodiment of the present disclosure.

FIG. 5 is a sequence diagram showing a procedure of appliance control by the appliance control system according to the embodiment of the present disclosure. As in FIG. 2, the user U of the control device 2, the control device 2, and the appliances 1a and 1b respectively providing the services Sa and Sb, for example, are shown in FIG. 5. In the example shown in FIG. 5, the appliance 1a is a network TV that provides services S such as a Web browsing service, a content output service, and a search service. Also, the appliance 1b is an HDD recorder that provides services S such as a content reproduction service and a recording service.

As shown in FIG. 5, at the time of appliance control, the user U specifies a specific appliance 1 and instructs the control device 2 to connect with the appliance 1 (step S51). In the example shown in FIG. 5, the appliance 1a is specified as the specific appliance 1. When the connection instruction is received via the operation unit 12, the control unit 15 instructs the appliance detection unit 16 to perform appliance detection.

The appliance detection unit 16 detects the appliances 1a and 1b by distributing, in cooperation with the communication unit 11, a detection request to the appliances 1a and 1b with which connection over the network 3 is possible (step S52) and receiving detection responses from the appliances 1a and 1b that have received the detection request (steps S53, S54). Detection of the appliance 1 is performed using an UPnP Discovery command, for example. When the appliances 1a and 1b are detected, the control unit 15 establishes connection with the specific appliance 1a via the communication unit 11 (step S55).

When connection with the appliance 1a is established, the control unit 15 acquires the appliance information by accessing the designated destination described in the detection response via the communication unit 11 (steps S56, S57). Acquisition of the appliance information is performed using a HTTP (Hyper Text Transfer Protocol) Get command, for example.

When the appliance information is acquired, the list acquisition unit 17 acquires the action list ALa (list of functions) by accessing the designated destination described in the appliance information via the communication unit 11 (steps S58, S59). Acquisition of the action list AL is performed using a HTTP Get command, for example. The list providing unit 24 reads the action list ALa of the service Sa from the storage unit 22 in response to the access (step S58), and provides the same to the control device 2 via the communication unit 21 (step S59). The list acquisition unit 17 stores the acquired action list ALa in the storage unit 14 in association with the service Sa of the appliance 1a.

The action list AL here is a list showing actions A (functions) that become executable due to the service S, and is managed by the appliance 1. However, unlike the general appliance control system, according to the appliance control system of the present embodiment, the action list AL includes, together with the list of actions A, information for specifying the protocol specification P that is determined for each action A with respect to each service S of each appliance 1.

Figure 6:
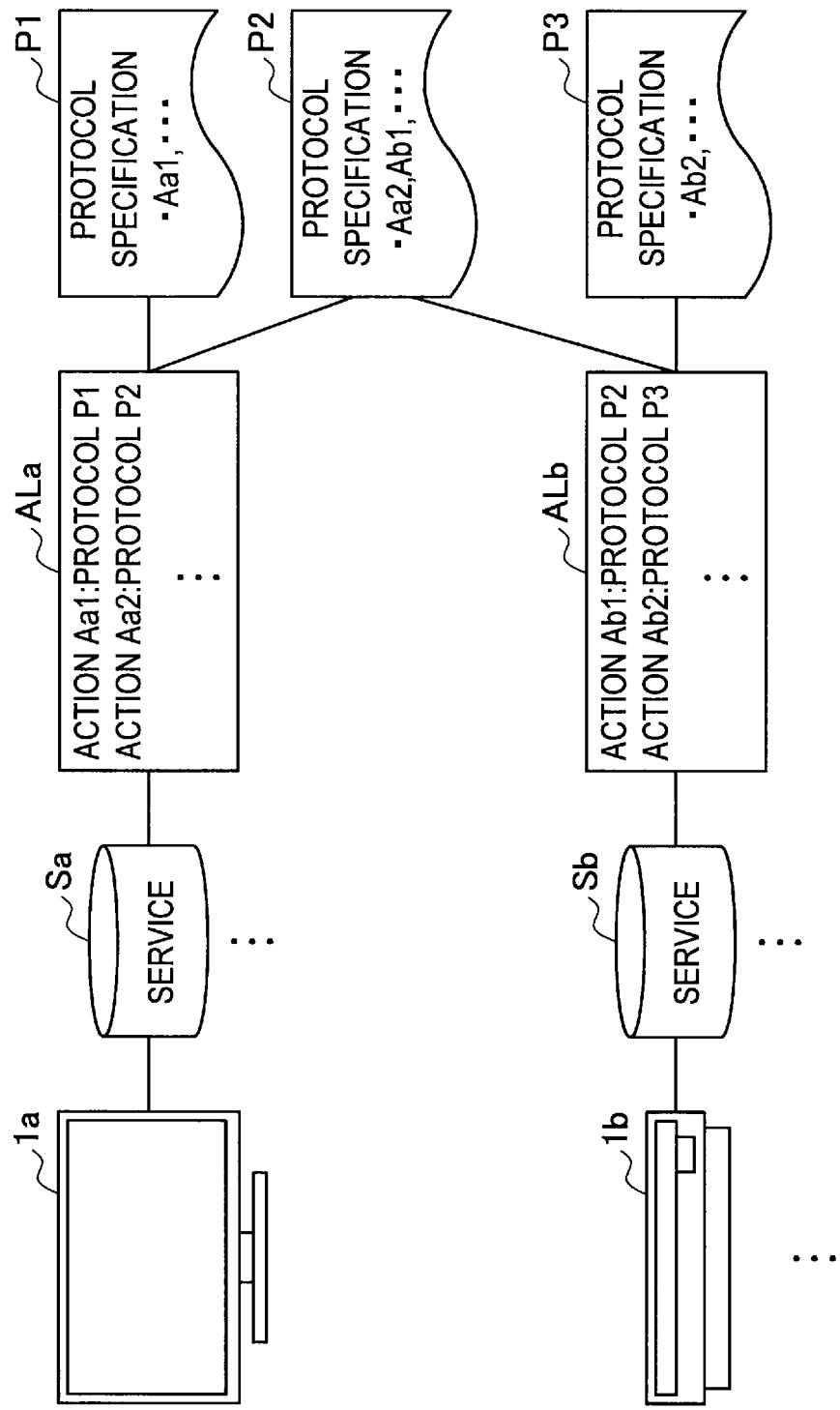
FIG. 6 is a diagram showing an example of an action list according to the embodiment of the present disclosure.

FIG. 6 is a diagram showing an example of the action list AL according to the embodiment of the present disclosure. As shown in FIG. 6, regarding the service Sa of the appliance 1a, a protocol specification P1 is specified for an action Aa1 and a protocol specification P2 is specified for an action Aa2. Also, regarding the service Sb, the protocol specification P2 is specified for an action Ab1 and a protocol specification P3 is specified for an action Ab2. Furthermore, the actions Aa1, Aa2, and the like, that become executable due to the service Sa are specified for the action list ALa in association with the corresponding protocols P1, P2, and the like. Similarly, the actions Ab1, Ab2, and the like, that become executable due to the service Sb are specified for the action list ALb in association with the corresponding protocols P2, P3, and the like.

FIG. 7 is a diagram showing an example of the action list AL. As shown in FIG. 7, a plurality of <action> elements that become executable due to the service S are described in an <actionList> element.

In the example shown in FIG. 7, <action> elements, "register," "getSystemInformation," "getRemoteCommandList," "getStatus," "getText," "SendText," "getContentInformation," "getHistoryList," "getWebServiceList," and "sendContent" are described. Additionally, a concrete example of the action A will be described later.

The <action> element includes, as attributes, "name," "ver," "mode," and "url." The "name" attribute is the identification name of the action A. Also, the "mode" attribute is used with respect to a specific action A to specify an operation mode of the action A. The "ver" attribute is version information of the action A, and corresponds to information for specifying the protocol specification P determined for each action A. The "url" attribute is information indicating the destination of the execution request for the action A, and specifies a specific appliance 1 specified by the user U (the appliance 1a in the example shown in FIG. 5) or another resource on the network 3 (the appliance 1b in the example shown in FIG. 5).

According to the example of the action A "register" shown in FIG. 7, "1.2" is described as the version information, "1" is described as the operation mode, and "http://192.168.1.1:80/register" is described as the execution request destination. For example, if the appliance 1a is specified as the execution request destination, the control device 2 will, according to the protocol specification P of version "1.2" and by the operation mode "1," request the service Sa of the appliance 1a for execution of the action A for registering the control device 2 with the appliance 1a.

Furthermore, according to the action A "getSystemInformation," "1.3" is described as the version information, and "http://192.168.2.1:80/getSystemInformation" is described as the execution request destination. For example, if the appliance 1b is specified as the execution request destination, the control device 2 will request the service Sb of the appliance 1b for execution of the action A for providing system information, according to the protocol specification P of version "1.3" and by using the action list AL of the service Sa provided by the appliance 1a.

When the action list ALa is acquired, the control unit 15 compares the information for specifying the protocol specification P (the version information of the action A) and the protocol specification P stored in the storage unit 14, and thereby determines whether there is compatibility with the service Sa provided by the appliance 1a (step S60). That is, the control unit 15 determines whether the protocol specification P that is managed in association with the version information of the action A is stored.

If there is compatibility with the service Sa, the control unit 15 generates an operation screen based on the information read from the storage unit 14, and displays the same by the display unit 13 (step S61). The control unit 15 generates an operation screen that is different depending on the content of the action A included in the action list ALa. The user U inputs a desired operation by the operation screen (step S62).

When the operation input is received, the execution request unit 18 requests the service Sa via the appliance 1a for execution of an action A corresponding to the operation input (steps S63, S64). The execution request unit 18 reads the action list ALa corresponding to the service Sa from the storage unit 14, and identifies the protocol specification P specified for the action A for which the request has been made (step S63). Then, the execution request unit 18 specifies, via the communication unit 11, a procedure referred to as the action A and its argument, and calls out the service Sa via the appliance 1a (step S64). The control device 2 thereby functions as a remote procedure call interface for the service Sa.

When execution of the action A is requested, the execution unit 25 executes the action A for which the request has been made (step S65), and transmits a response according to the action A to the control device 2 via the communication unit 21 (step S66). The control unit 15 generates an execution result of the action A corresponding to the operation input, and displays the same by the display unit 13 (step S67).

Additionally, in the above, a case where execution of the action A is requested to a specific appliance 1 (the appliance 1a in the example shown in FIG. 5) has been described. However, depending on the action A, execution of the action A may be requested to other appliances 1 to which connection is possible via the network 3 (the appliance 1b in the example shown in FIG. 5).

According to the appliance control system of the present embodiment, the control device 2 acquires from the appliance 1 the action list AL including information for specifying the protocol specification P that is determined for each action A with respect to each service S of each appliance 1. The control device 2 is spared from having to manage the protocol specification P that is different for each service S with respect to each appliance 1 in association with the service S of the appliance 1, and unification of implementations is facilitated. Also, compatibility with an appliance 1 whose protocol specification P is not managed is achieved. Accordingly, compatibility among a plurality of different appliances can be improved with respect to management of the protocol specification P.

Also, even if respective individual protocol specifications P are not prepared, a protocol specification P that is common on a per-action A basis can be shared among a plurality of different appliances 1 or a plurality of different services S. Accordingly, compatibility among a plurality of different appliances can be improved also with respect to use of the protocol specification P.

[5. Concrete Example of Action A]

Concrete examples of the action A included in the action list AL will be described with reference to FIGS. 8 to 18.

FIGS. 8A and 8B are diagrams showing an execution example of the action A "register." This action A is for registering the control device 2 with the appliance 1. As the parameter, the device name of the control device 2, the type of registration (initial registration, update registration), and the device identifier are specified. Two operation modes are defined for this action A. In operation mode 1, the action A is received only when the appliance 1 is in the state of registration mode, and in operation mode 2, the action A is received at all times and also the appliance 1 displays a message urging registration.

In the example shown in FIGS. 8A and 8B, the control device 2 requests for execution of the action A (Req1) using a HTTP Get command specifying a device name "Client1," the type of registration "Initial," and a device identifier "ClientName%3a00 00 00 00 00 01." When registration with the appliance 1 succeeds, a response "200OK" (Res1) is received by the control device 2.

FIGS. 9A and 9B are diagrams showing an execution example of the action A "getSystemInformation." This action A is for acquiring system information of the appliance 1. As the system information, the name of the appliance 1, generation information, area information, the controller model number, the type of supported content, the content source, and the like, are acquired.

In the example shown in FIGS. 9A and 9B, in response to the execution request for the action A (Req2), the control device 2 acquires the system information of the appliance 1 (Res2) together with the response "200OK." As the system information, the name of the appliance 1, "BDPlayer," the generation information "2011," the area information "US," the controller model numbers "RMT-XXX1," "RMT-XXX2," and "RMT-XXX3," the types of supported content "video" and "music," and the input sources "CD," "DVD," and "BD" are acquired.

FIGS. 10A and 10B are diagrams showing an execution example of the action A "getRemoteCommandList." This action A is for acquiring remote command information supported by the appliance 1. As the command information, controller code information, and the URL information used for operation are acquired.

In the example shown in FIGS. 10A and 10B, in response to the execution request for the action A (Req3), the control device 2 acquires the command information of the appliance 1 (Res3). As the command information, a code protocol "ircc (infrared code)," and a code value "AAAgAHFoAA5A==" are acquired as the "UP" command, for example. Also, a code protocol "url," and a code value (URL) "http://102.168.1.1/Home" are acquired for the "Home" command, for example.

FIGS. 11A and 11B are diagrams showing an execution example of the action A "getStatus." This action A is for acquiring the status information of the appliance 1.

In the example shown in FIGS. 11A and 11B, in response to the execution request for the action A (Req4), the control device 2 acquires the status information of the appliance 1 (Res4). As the status information, "viewing," the input source of content "BD," the reproduction time "3600" seconds, the current reproduction point "60" seconds, and the reproduction speed "1" are acquired.

FIGS. 12A and 12B are diagrams showing an execution example of the action A "getWebServiceList." This action A is for acquiring the list of Web applications provided by the appliance 1. As the parameter, language information of the control device 2 is specified.

In the example shown in FIGS. 12A and 12B, in response to the execution request for the action A specifying "jp (Japanese)" as the language information (Req5), the control device 2 acquires the list of Web applications (Res5). As the list of applications, the ID of the service S, the title of the service S, the description of the service S, the URL of the service S, the URL of the image (icon) of the service S, and the like, are acquired for "service1."

FIGS. 13A and 13B are diagrams showing an execution example of the action A "getContentInformation." This action A is for acquiring the detailed information of content that is being reproduced by the appliance 1.

In the example shown in FIGS. 13A and 13B, in response to the execution request for the action A (Req6), the control device 2 acquires the detailed information of the content (Res6). As the detailed information, the type of content, the input source, the title, the edition, the detailed description, the genre, the icon data, the reproduction time, the actor, the director, the producer, the screen writer, the rating information, and the release date are acquired.

FIGS. 14A and 14B are diagrams showing an execution example of the action A "getHistoryList." This action A is for acquiring the history information of the appliance 1. As the parameter, the type of content whose history information is to be acquired is specified.

In the example shown in FIGS. 14A and 14B, in response to the execution request for the action A specifying the type of content "video" (Req7), the control device 2 acquires the history information of the reproduced video content (Res7). As the history information, the title of content, and the source URL of content information are acquired.

FIGS. 15A and 15B are diagrams showing an execution example of the action A "getText." This action A is for acquiring a character string from the appliance 1. In the example shown in FIGS. 15A and 15B, in response to the execution request for the action A (Req8), the control device acquires a response including the character string "TextData" (Res8), together with the response "200OK."

FIGS. 16A and 16B are diagrams showing an execution example of the action A "sendText." This action A is for providing a character string to the appliance 1. As the parameter, the character string to be provided is specified. In the examples shown in FIGS. 16A and 16B, the control device 2 specifies the character string "TextData," and requests for execution of the action A (Req9). Then, when the character string is successfully received by the appliance 1, the control device 2 receives the response "200OK" (Res9).

FIGS. 17A and 17B are diagrams showing an execution example of the action "getContent." This action A is for acquiring content data from the appliance 1. In the example shown in FIGS. 17A and 17B, in response to the execution request for the action A (Req10), the control device 2 acquires a response including the source URL of the content data (Res10).

FIGS. 18A and 18B are diagrams showing an execution example of the action A "sendContent." This action A is for providing content data to the appliance 1. As the parameter, the receiver of the content data, the type of content data, the length of content, and the content source URL are specified. In the example shown in FIGS. 18A and 18B, the control device 2 requests for execution of the action A (Req11) using a HTTP POST command specifying the content data receiver "192.168.1.1," the type of content "application . . . ," and the length of content "32." Then, when the content data is successfully received by the appliance 1, the control device 2 receives the response "200OK" (Res11).

It should be understood by those skilled in the art that various modifications, combinations, sub-combinations and alterations may occur depending on design requirements and other factors insofar as they are within the scope of the appended claims or the equivalents thereof.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An appliance control device to control at least one of a plurality of appliances in which each appliance has a respective individual protocol associated therewith that is different for each service with respect to the respective appliance, said appliance control device comprising:
a control unit configured to:
acquire a list identifying each function executable due to a respective service by a first appliance, the list including information of the respective individual protocol indicative of a corresponding protocol corresponding to each said function with respect to each said service of the first appliance, said first appliance being operable to provide a number of services each having a number of respective functions associated therewith; and,
transmit a request to the first appliance for execution of a desired function selected from the list identifying the one or more functions executable by the first appliance, the transmitted request being transmitted in accordance with a specified protocol selected from a specified plurality of protocols, the specified protocol being selected from the specified plurality of protocols based on the information in the list indicative of the corresponding protocol corresponding to the desired function,
in which the appliance control device is separate from the first appliance, and
in which the control unit acquires the list including the information of the respective individual protocol from the first appliance in response to a request for the list so as to avoid having the control unit manage an individual protocol which is different for each service with respect to each said appliance such that the appliance control device is unable to cause the first appliance to execute the desired function until after the list is acquired in response to the request for the list.

2. The appliance control device of claim 1, wherein the control unit is further configured to:
receive an instruction to connect to one or more appliances in the plurality of appliances which include the first appliance;
transmit, based on the instruction to connect to the one or more appliances, a detection request to each of the one or more appliances;
receive a detection response from each of the one or more appliances in response to the detection request transmitted to each of the one or more appliances;
establish, based on the detection response received from each of the one or more appliances, a connection with each of the one or more appliances;
transmit, upon establishment of the connection with each of the one or more appliances, a request for information to each of the one or more appliances;
receive, in response to the transmitted request for information to each of the one or more appliances, respective appliance information from each of the one or more appliances; and,
transmit, based on the respective appliance information received each of the one or more appliances, a respective request to each of the one or more appliances to acquire a list identifying one or more functions executable by each respective appliance in the one or more appliances.

3. The appliance control device of claim 1, wherein at least one corresponding protocol is respectively indicated in the list as being a HyperText Transfer Protocol ("HTTP"), and wherein at least one of the specified plurality of protocols specifies the HTTP protocol.

4. The appliance control device of claim 1, wherein at least two corresponding protocols respectively indicated in the list are different versions of a same protocol, each of the different versions of the same protocol being specified in the specified plurality of protocols.

5. The appliance control device of claim 1, wherein the control unit is further configured to select the specified protocol based on a determination that the specified protocol is compatible with the corresponding protocol indicated in the list as corresponding to the desired function.

6. The appliance control device of claim 1, wherein:
the acquired list further includes information indicative of a corresponding destination corresponding to each said function; and,
the control unit is further configured to:
transmit the request to execute the desired function to the first appliance at a selected destination using the specified protocol, the selected destination being selected based on the information in the list indicative of the corresponding destination corresponding to the desired function.

7. The appliance control device of claim 6, wherein the corresponding destination corresponding to the desired function is a network address.

8. The appliance control device of claim 7, wherein the network address is a Uniform Resource Locator ("URL").

9. The appliance control device of claim 1, wherein the appliance control device is configured to communicate with the first appliance via a network.

10. The appliance control device of claim 9, wherein the network is a wireless network.

11. The appliance control device of claim 2, wherein the detection request transmitted to the first appliance is a Universal Plug And Play ("UPnP") command.

12. The appliance control device of claim 1, in which the first appliance is configured as a television, and in which the appliance control device is configured as a remote control to control the television.

13. A non-transitory computer-readable storage unit on which computer readable instructions of a program are stored, the instructions, when executed by a control unit to control at least one of a plurality of appliances in which each appliance has a respective individual protocol associated therewith that is different for each service with respect to the respective appliance, causing the control unit to:
   acquire a list identifying each function executable due to a respective service by a first appliance, the list including information of the respective individual protocol indicative of a corresponding protocol corresponding to each said function with respect to each said service of the first appliance, said first appliance being operable to provide a number of services each having a number of respective functions associated therewith; and,
   transmit a request to the appliance for execution of a desired function selected from the list identifying the one or more functions executable by the appliance, the transmitted request being transmitted in accordance with a specified protocol selected from a specified plurality of protocols, the specified protocol being selected from the specified plurality of protocols based on the information in the list indicative of the corresponding protocol corresponding to the desired function,
   in which the control unit is separate from the first appliance, and
   in which the control unit acquires the list including the information of the respective individual protocol from the first appliance in response to a request for the list so as to avoid having the control unit manage an individual protocol which is different for each service with respect to each said appliance such that the control unit is unable to cause the first appliance to execute the desired function until after the list is acquired in response to the request for the list.

14. A method for operating an appliance control device to control at least one of a plurality of appliances in which each appliance has a respective individual protocol associated therewith that is different for each service with respect to the respective appliance, the method comprising:
   acquiring a list identifying each function executable due to a respective service by a first appliance, the list including information of the respective individual protocol indicative of a corresponding protocol corresponding to each said function with respect to each said service of the first appliance, said first appliance being operable to provide a number of services each having a number of respective functions associated therewith; and,
   transmitting, using a processor, a request to the appliance for execution of a desired function selected from the list identifying the one or more functions executable by the appliance, the transmitted request being transmitted in accordance with a specified protocol selected from a specified plurality of protocols, the specified protocol being selected from the specified plurality of protocols based on the information in the list indicative of the corresponding protocol corresponding to the desired function,
   in which the appliance control device is separate from the first appliance, and
   in which the appliance control device acquires the list including the information of the respective individual protocol from the first appliance in response to a request for the list so as to avoid having the appliance control device manage an individual protocol which is different for each service with respect to each said appliance such that the appliance control device is unable to cause the first appliance to execute the desired function until after the list is acquired in response to the request for the list.

15. The method of claim 14, wherein the specified protocol selected from the specified plurality of protocols is a Hyper-Text Transfer Protocol ("HTTP"), and the transmitted request to the appliance for execution of the desired function is transmitted via a network using the HTTP protocol.

* * * * *